United States Patent [19]

Ohta

[11] Patent Number: 4,489,332

[45] Date of Patent: Dec. 18, 1984

[54] INFORMATION RECORDING METHOD AND APPARATUS

[75] Inventor: Wasaburo Ohta, Yokohama, Japan

[73] Assignee: Ricoh Company, Ltd., Japan

[21] Appl. No.: 435,262

[22] Filed: Oct. 19, 1982

[30] Foreign Application Priority Data

Oct. 19, 1981 [JP] Japan ............................... 56-166919

[51] Int. Cl.[3] ............................................ G01D 15/12

[52] U.S. Cl. .................................................. 346/74.2

[58] Field of Search ............... 346/74.2; 118/657, 658; 427/48

[56] References Cited

U.S. PATENT DOCUMENTS 2,857,290 10/1958 Bolton ............................... 346/74.2

*Primary Examiner*—Thomas H. Tarcza
*Attorney, Agent, or Firm*—Guy W. Shoup

[57] ABSTRACT

An information recording method and apparatus for forming a magnetic latent image on a magnetic recording medium, developing the magnetic latent image to a visible image with a magnetic toner and recording the developed images on a recording sheet, in which the magnetic toner is electrically charged to a predetermined polarity; and a rotatable magnetic recording medium comprising a magnetic recording layer for forming a magnetic latent image thereon is also electrically charged to the same polarity as that of the electrically charged magnetic toner, in such a manner that the magnetic attraction between the electrically charged magnetic toner and the magnetic latent images is stronger than the electrostatic repulsion between the electrically charged magnetic toner and the electrically charged magnetic-latent-image-bearing recording medium, but said electrostatic repulsion predominates in the background areas, whereby deposition of the toner on the background areas outside the image area is completely eliminated.

11 Claims, 5 Drawing Figures

INFORMATION RECORDING METHOD AND APPARATUS

BACKGROUND OF THE INVENTION

The present invention relates to an improved information recording method and apparatus in which magnetic latent images are formed on a recording medium by a magnetic head, and the magnetic latent images are developed to visible images by a magnetic toner; and more particularly to an information recording method and apparatus of the above type in which the magnetic toner and the magnetic-latent-image-bearing recording medium are electrically charged to the same polarity, so that the magnetic toner is electrostatically repelled from the recording medium in the background areas of the images, even where magnetic latent image-like patterns that should not be developed have been formed, while, in the image areas, the attraction between the magnetic toner and the magnetic latent images predominates over the electrostatic repulsion between the magnetic toner and the recording medium, whereby the magnetic toner is deposited on those magnetic latent images in the intended image area only.

In the conventional information recording method and apparatus of this type, the background areas on a magnetic recording medium, outside the magnetic latent image areas, are occasionally slightly magnetized when a magnetic latent image is formed, for instance, due to the formation of a closed magnetic field by the magnetic recording head during the latent image formation process. If magnetic latent images on a recording medium with such a magnetized background are subjected to development by use of a magnetic toner, both the magnetic latent images and the background are developed, though to differing degrees. This is the so-called "deposition of toner on the background" or "fog of the background." It occurs because one end portion of each magnetic toner particle is polarized to an N pole, while the other is polarized to an S pole, and, when the background is magnetized (to whatever polarity), the toner particles are attracted thereto and deposited thereon.

SUMMARY OF THE INVENTION

It is therefore an object of the present invention to provide an improved information recording method and apparatus by which magnetic latent images are developed to clear visible images by a magnetic toner, with elimination of the conventionally unavoidable shortcoming of the deposition of the toner on the background.

This object of the present invention is attained by a method and apparatus in which the magnetic toner and the magnetic-latent-image-bearing recording medium are electrically charged to the same polarity, thereby electrostatically repelling the magnetic toner from the recording medium in the background areas of the images, while, in the image areas, the magnetic attraction between the magnetic toner and the magnetic latent images is stronger than the electrostatic repulsive force of the recording medium acting upon the magnetic toner, allowing the magnetic toner to be deposited on those magnetic latent images in the image area only.

DETAILED DESCRIPTION OF THE PREFERRED EMBODIMENTS

Figure 1:
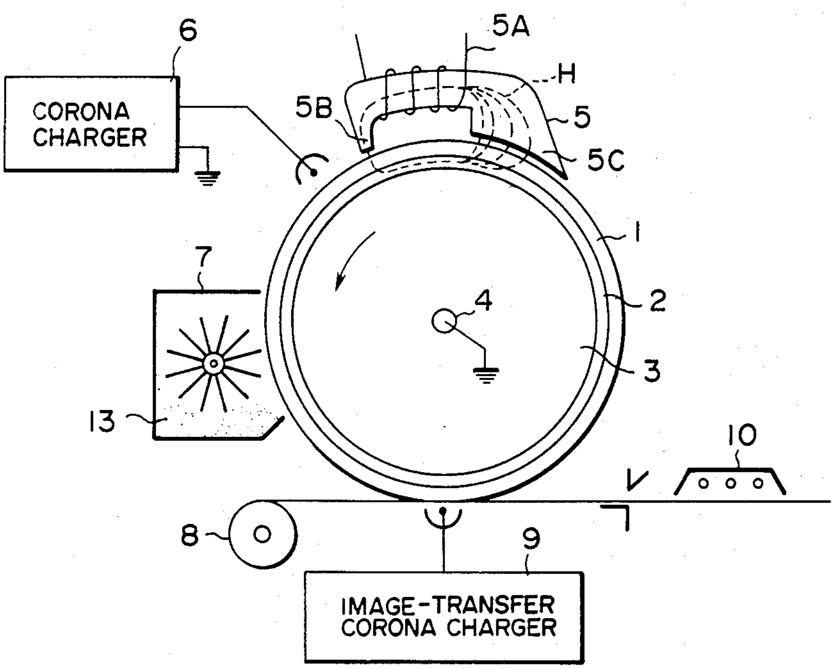
FIG. 1 is a schematic illustration of an embodiment of an information recording apparatus according to the present invention.

The principle of the present invention will first be explained.

In a magnetic toner for developing magnetic latent images, one end.portion of each toner particle is polarized to an N pole and the other end portion thereof to an S pole, since usually one magnetic pole cannot not exist alone. Therefore, the magnetic toner particles are attracted to any magnetic latent image regardless of its magnetic polarity. It never occurs that magnetic toner is magnetically repelled by a magnetic latent image.

In a magnetic-latent-image-bearing magnetic recording material, it is extremely difficult to erase only the magnetism in the background, without disturbing or erasing the magnetic latent images to be developed. Furthermore, as discussed above, even if the background area is magnetized to a polarity opposite to that of the magnetic latent image area, the magnetic toner will be attracted to that background in spite of the opposite polarity, so that the deposition of toner on the background cannot be eliminated by that means.

The principle of the present invention is that the magnetic toner is prepared so as to be electrically chargeable, and the magnetic toner and the magnetic-latent-image-bearing recording medium are electrically charged to the same polarity, so that the magnetic toner is electrostatically repelled from the recording medium in the background areas of the magnetic latent images, while, in the intended image areas, that repulsive force acting upon the magnetic toner is weaker than the attraction of the magnetic toner to the magnetic latent images, allowing the magnetic toner to be deposited on those magnetic latent images in the image area only.

As the above-mentioned chargeable magnetic toner, the following dry-type magnetic toner and liquid-type magnetic toner can be employed in the present invention.

For example, a chargeable dry-type magnetic toner is prepared by mixing and kneading (1) a magnetic powder, such as $CrO_2$, $Fe_2O_3$ or $Fe_3O_4$, (2) a synthetic resin which is employed in conventional toners for use in electrophotography, such as acrylic resin or a vinyl-type resin, and (3) if coloring of the toner is necessary, carbon black, a coloring agent or a dye, in an organic solvent, such as toluene, methyl ethyl ketone or ethyl acetate; and drying and pulverizing the mixture by centrifugal drying.

The thus prepared electrically chargeable dry-type magnetic toner becomes charged triboelectrically by mixing with a relatively coarse beaded material called the carrier, for instance, glass beads.

An electrically chargeable liquid-type magnetic toner is prepared by mixing and kneading (1) the above mentioned magnetic powder, such as $CrO_2$, $Fe_2O_3$ or $Fe_3O_4$, (2) a synthetic resin, such as acrylic resin or alkyd resin, and (3) if the coloring of the toner is necessary, carbon black, a pigment or a dye for use in electrophotography, in an organic solvent, such as toluene, methyl ethyl ketone or ethyl acetate, and dispersing the mixture in a high-resistivity liquid, for instance, a liquid paraffin hydrocarbon.

An electric field for repelling the magnetic toner from the magnetic recording medium in the background area is formed as follows:

In the case where the magnetic recording medium comprises a magnetic recording layer with a specific volume resistivity of about $10^{12}$ Ωcm or more, for instance, in the case where a magnetic recording layer is prepared by mixing (i) a magnetic material, such as $CrO_2$, $Fe_2O_3$ or $Fe_3O_4$, and (ii) a binder agent, such as polyvinyl chloride or polyvinyl acetate, the support material for the magnetic recording layer is made of an electrically conductive material.

After a magnetic latent image is formed on the magnetic recording layer of the recording medium, the magnetic recording layer is electrically charged by a corona charger.

This charging is conducted so as to form an electric field at the recording medium with such an intensity that, in the background areas, the magnetic toner is repelled from the recording medium due to the electrostatic repulsion between them, while, in the magnetic latent image areas, the magnetic attraction between the magnetic toner and the magnetic latent images predominates over the electrostatic repulsion between the magnetic toner and the recording medium, so that the magnetic toner is deposited on the magnetic latent images only.

In the case where the magnetic recording medium comprises an electroconductive magnetic recording layer with a specific volume resistivity of about $10^1$ Ωcm or less, for instance, where it is made of an Fe-Ni-Co alloy, MnBi, MnAlGe or GdFe, formed by sputtering or vacuum evaporation, the support material for the magnetic recording layer is also made of an electroconductive material, for instance, a metal. The electric field for repelling the magnetic toner from the background of the magnetic latent images is formed at the thus prepared magnetic recording medium by applying a voltage between the support material and a development electrode of a development apparatus employed for development of the magnetic latent images.

Referring to FIG. 1, there is schematically shown an embodiment of an information recording apparatus according to the present invention.

In the figure, reference numeral 1 represents a drum-shaped magnetic recording layer with vertical magnetic anisotropy; and reference numeral 2, a closed-magnetic-field formation member with high permeability. The drum-shaped magnetic layer 1 and the closed-magnetic-field formation member 2 are grounded through a flange 3 made of an electrically conductive disc and through a rotary shaft 4.

Reference numeral 5 represents a magnetic head with a magnetic-field formation coil 5A wound therearound; reference numeral 6, a corona charger for electrically charging the magnetic recording layer 1; reference numeral 7, a conventional development apparatus for use in electrophotography; reference numeral 13, a magnetic toner; reference numeral 8, a recording sheet; reference numeral 9, an image-transfer corona charger for transferring a developed image from the magnetic recording layer 1 to the recording sheet 8 by applying electric charges to the developed images consisting of the electrically charged magnetic toner 13; and reference numeral 10, an image-fixing unit.

The operation of the information recording apparatus shown in FIG. 1 will now be explained.

In FIG. 1, as the magnetic recording layer 1 is driven in rotation in the direction of the arrow by a drive apparatus (not shown), the magnetic recording layer 1 passes between the magnetic head 5 and the closed-magnetic-field formation member 2. At that moment, when a signal current corresponding to the information to be recorded flows through the magnetic-field formation coil 5A, a closed magnetic field H as shown by the dotted lines is formed between the magnetic head 5 and the closed-magnetic-field formation member 2. As a result, the magnetic recording layer 1 is magnetized by a portion 5B of the magnetic head 5 in image or code patterns corresponding to the information to be recorded. At the same time, the magnetic recording layer 1 is slightly magnetized by a portion 5C of the magnetic head, which is inevitable so long as the magnetic latent images are formed by the closed magnetic field.

When no current flows through the magnetic-field formation coil 5A, no closed magnetic field is formed, and, therefore, no magnetization of the magnetic recording layer 1 takes place.

In other words, recording of information on the magnetic recording layer 1 is performed by causing a signal current corresponding to the information to be recording to flow through the magnetic-field formation coil 5A, with the formation of a magnetic field corresponding to the information, and forming a magnetic latent image corresponding to the magnetic field on the magnetic recording layer 1.

After formation of the magnetic latent image on the magnetic recording layer 1, the magnetic recording layer 1 is then electrically charged to the same polarity as that of the magnetic toner for development of the magnetic latent image by the corona charger 6 disposed between the magnetic head 5 and the development apparatus 7.

With further rotation, the magnetic recording layer 1 comes to the development apparatus 7 where the magnetic latent image is developed by the magnetic toner 13 which is triboelectrically charged within the development apparatus 7 to the same polarity as that of the magnetic recording layer 1.

Since the magnetic toner 13 is electrically charged to the same polarity as that of the magnetic recording layer 1, the magnetic toner is repelled from the background areas outside the magnetic latent image areas, while, in the magnetic latent image areas, the magnetic toner is attracted to the magnetic latent images since the magnetic attraction between the magnetic toner and the magnetic latent images is stronger than the electrostatic repulsion between the magnetic toner and the magnetic recording layer 1. As a result, the magnetic latent images are developed by the magnetic toner, without deposition of the magnetic toner in the background areas outside the magnetic latent image areas.

The magnetic recording layer 1 which bears the developed images thereon is then brought into close contact with the recording sheet 8 as the magnetic recording layer 1 is rotated. By the image-transfer corona charger 9, the developed images are transferred from the magnetic recording layer 1 to the recording sheet 8 and are then fixed permanently to the recording sheet 8 by the image-fixing unit 10.

For development of the magnetic latent images, a variety of conventional development methods employed in the art of electrophotography, for instance, powder cloud development, cascade development, fur brush development and development by use of a liquid developer, can be employed either in the case where the magnetic recording layer 1 is electrically charged by corona charging as in the above explained embodiment shown in FIG. 1, or where an electric field is formed at the magnetic recording layer 1 by applying voltage thereto.

Referring to FIGS. 2 to 5, there are schematically shown other embodiments of an information recording apparatus according to the present invention, in which an electric field is formed at the magnetic recording layer 1 by applying voltage between the magnetic recording layer 1 and the development apparatus 7.

In those figures, the members and apparatus having the same functions as those of the members and apparatus as shown in FIG. 1 bear the same reference numerals.

Figure 2:
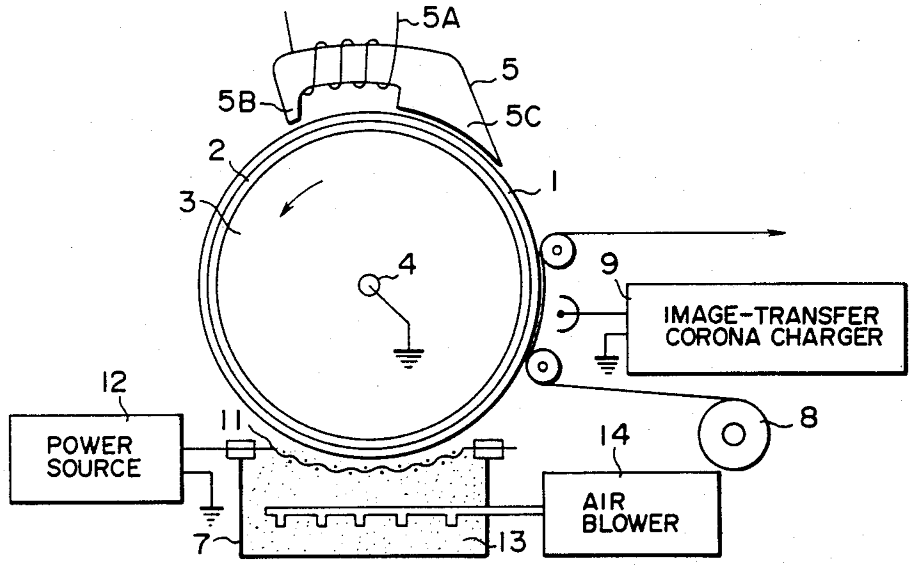
FIG. 2 is a schematic illustration of another embodiment of an information recording apparatus according to the present invention.

In FIG. 2, there is schematically shown another embodiment of an information recording apparatus according to the present invention, in which the development is performed by the powder cloud development method.

As shown in the figure, an electrode 11 comprising a plurality of electrically conductive wires or an electrically conductive net is disposed closely along the magnetic recording layer 1, with a small space maintained therebetween. A voltage is applied between the electrode 11 and the magnetic recording layer 1, or the support member of the magnetic recording layer 1, to form a toner-repelling electric field at the magnetic recording layer 1.

In the figure, reference numeral 12 represents a power source for applying voltage to the electrode 11; reference numeral 13, an electrically charged magnetic toner; and reference numeral 14, an air blower from which air is blown into the magnetic toner 13 to form a magnetic toner cloud. The air blower 14 serves not only as a toner cloud generator, but also as a charger by which the magnetic toner 13 is triboelectrically charged during the stirring of the magnetic toner 13 by air-blowing.

A voltage is applied to the electrode 11 by the power source 12, so that, as mentioned above, an electric field is formed at the magnetic recording layer 1. By that electric field, the magnetic toner 13 is repelled from the magnetic recording layer 1 outside of the magnetic latent image areas, and the magnetic toner 13 is allowed to be deposited at the magnetic latent images only. Hereinafter that electric field is referred to as the magnetic-toner-repelling electric field.

Figure 3:
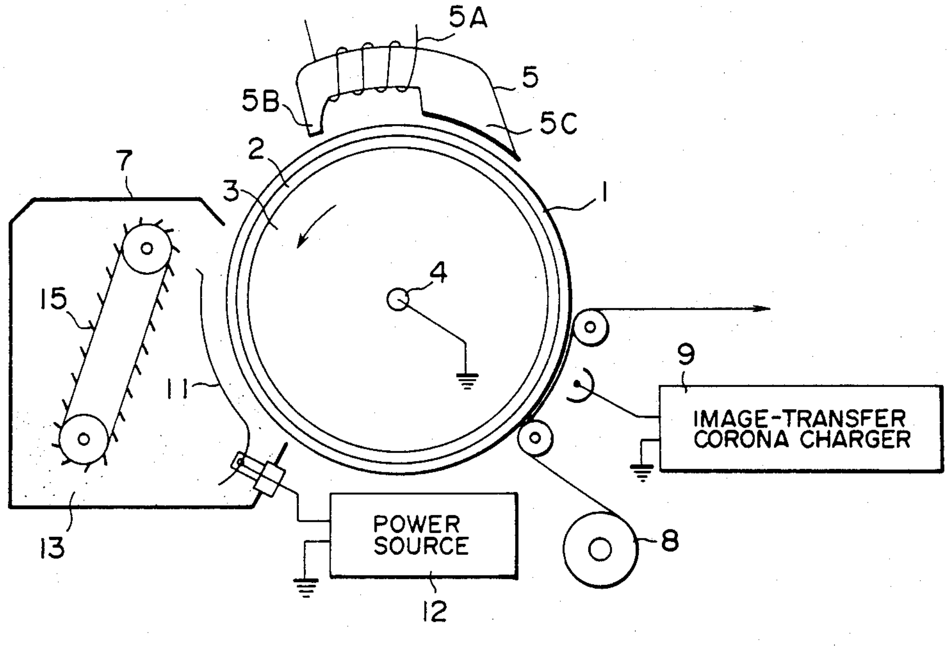
FIGS. 3 through 5 are schematic illustrations of further embodiments of an information recording apparatus according to the present invention.

Referring to FIG. 3, there is schematically shown a further embodiment of an information recording apparatus according to the present invention, in which the development is performed by the cascade development method.

As in the embodiment shown in FIG. 2, an electrode 11 in the form of a net or a perforated plate is disposed along the magnetic recording layer 1 with a small space maintained therebetween. A voltage is applied between the electrode 11 and the magnetic recording layer 1 by the power source 12, so that a magnetic-toner-repelling electric field is formed at the magnetic recording layer 1. In the figure, reference numeral 15 represents a cascade member of the development apparatus 7.

Figure 4:
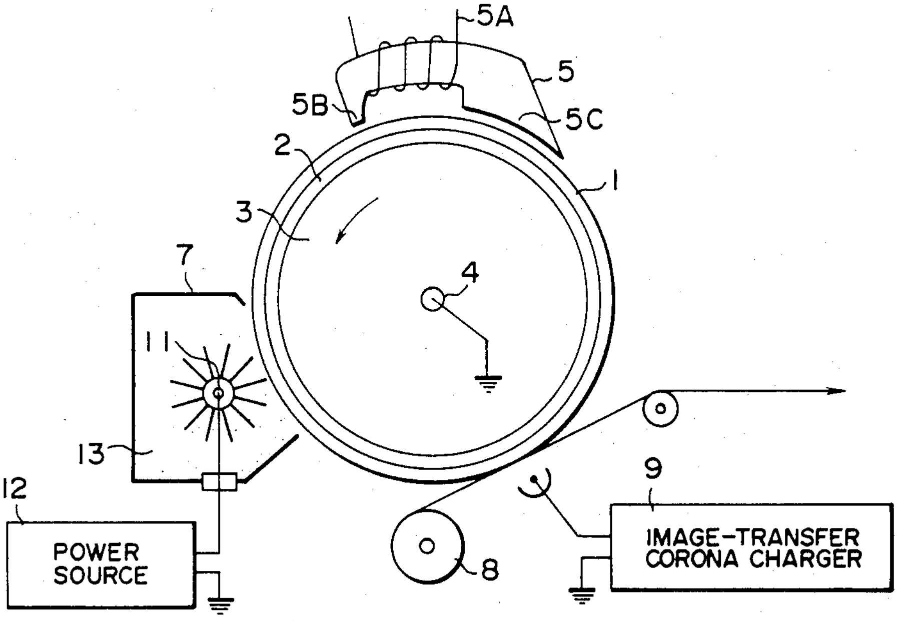

Referring to FIG. 4, there is schematically shown a still further embodiment of an information recording apparatus according to the present invention, in which the development is performed by the fur brush development method.

In this embodiment, the electrode 11 comprises an electrically conductive core member and a fur brush, made of, for instance, animal hairs, or vegetable or synthetic fibers, in the form of a cylindrical brush rotated by the core member, the fur brush bearing the magnetic toner thereon and contacting the magnetic recording layer with a light stippling motion. As in the embodiment shown in Fig. 3, a voltage is applied between the magnetic recording layer 1 and the electrically conductive core member of the electrode 11, whereby a magnetic-toner-repelling electric field is formed at the magnetic recording layer 1, and, at the same time, the magnetic latent image is developed by the magnetic toner which is triboelectrically charged by the fur brush of the electrode 11.

Figure 5:
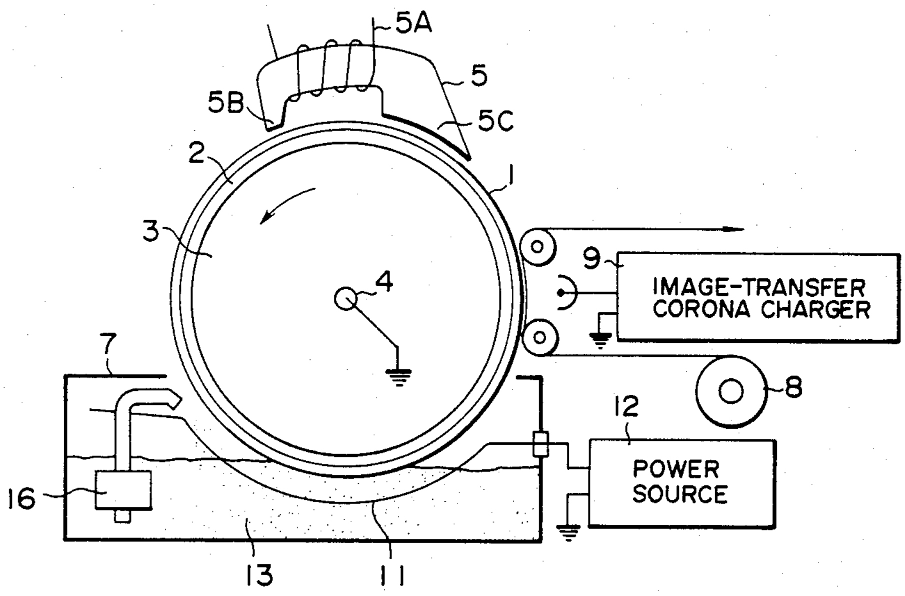

Referring to FIG. 5, there is schematically shown still another embodiment of an information recording apparatus according to the present invention, in which the development is performed by use of a liquid magnetic developer containing magnetic toner particles electrically charged to the same polarity as that of the magnetic recording layer 1.

As shown in the figure, an electrode 11 in the form of a plate or a net is disposed along the magnetic recording layer 1 with a small space maintained therebetween. A voltage is applied between the electrode 11 and the magnetic recording layer 1 by the power source 12, so that a magnetic-toner-repelling electric field is formed at the magnetic recording layer 1. In the figure, reference numeral 16 represents a stirrer pump for stirring the liquid magnetic developer 13.

The described embodiments are intended to be merely exemplary and those skilled in the art will be able to make variations and modifications in them without departing from the spirit and scope of the invention.

For instance, in the case where the magnetic recording layer 1 is electrically chargeable by corona charging and the support member for the magnetic recording layer 1 is made of an electrically conductive material, the magnetic-toner-repelling electric field can be formed at the magnetic recording layer 1 by applying a voltage thereto by using one of the above-described development methods.

Furthermore, in the above-described embodiments, a drum-shaped magnetic recording layer with vertical magnetic anisotropy is employed. However, the present invention is not limited to such a magnetic recording layer with vertical magnetic anisotropy, but is applicable to a magnetic layer with horizontal magnetic anisotropy. All such modifications and variations are contemplated as falling within the scope of the claims.

What is claimed is:

1. In an information recording method of forming a magnetic latent image on a magnetic recording medium and developing said magnetic latent image with a magnetic toner, the improvement comprising the steps of:

electrically charging said magnetic toner to a predetermined polarity;

forming a magnetic latent image on said magnetic recording medium;

electrically charging uniformly the surface of the magnetic-latent-image-bearing recording medium to the same polarity as that of the electrically charged magnetic toner in such a manner that the magnetic attraction between said electrically charged magnetic toner and said magnetic latent image predominates over the electrostatic repulsion between said electrically charged magnetic toner and said electrically charged magnetic-latent-image-bearing recording medium; and developing said magnetic latent image to a visible image by said magnetic toner.

2. An information recording method as claimed in claim 1, further comprising the steps of transferring said visible image from said recording medium to a recording sheet and fixing said visible image thereto.

3. An information recording apparatus for forming a magnetic latent image on a magnetic recording medium and developing said magnetic latent image to a visible image with a magnetic toner, comprising:

a toner charging means for electrically charging said magnetic toner to a predetermined polarity;

a rotatable magnetic recording medium comprising a magnetic recording layer and a support member for supporting said magnetic recording layer, which magnetic recording layer is electrically chargeable and magnetizable, allowing the formation of magnetic latent images thereon;

a closed-magnetic-field formation member with high permeability disposed under said magnetic recording layer, a magnetic latent image formation means for forming magnetic latent images on said magnetic recording layer of said magnetic recording medium;

a charge application means for electrically charging said magnetic-latent-image-bearing recording medium to the same polarity as that of said electrically charged magnetic toner in such a manner that the magnetic attraction between said electrically charged magnetic toner and said magnetic latent images predominates over the electrostatic repulsion between said electrically charged magnetic toner and said electrically charged magnetic-latent-image-bearing recording medium;

a development means for developing said magnetic latent images to visible images by said magnetic toner;

an image transfer means for transferring said visible images from said recording medium to a recording sheet; and an image fixing means for fixing said visible image to said recording sheet.

4. An information recording apparatus as claimed in claim 3, wherein said magnetic latent image formation means comprises a magnetic head around which a magnetic-field formation coil is wound and through which magnetic-field formation coil a signal current corresponding to information to be recorded flows, forming an closed magnetic field between said magnetic head and said closed-magnetic-field formation member and magnetizing said magnetic recording medium to form said magnetic latent image thereon.

5. An information recording apparatus as claimed in claim 3, wherein said charge application means is a corona charger.

6. An information recording apparatus as claimed in claim 3, wherein said charge application means comprises an electrode extended along said recording layer with a small space therebetween, capable of applying a voltage between said electrode and said magnetic recording layer or said support member thereof.

7. An information recording apparatus as claimed in claim 6, wherein said electrode is disposed within said development means.

8. An information recording apparatus as claimed in claim 3, wherein said toner charging means is a stirring device for stirring said magnetic toner so as to charge said magnetic toner triboelectrically.

9. An information recording apparatus as claimed in claim 3, wherein said development means is selected from the group consisting of a powder cloud development apparatus, a cascade development apparatus, a fur brush development apparatus and a development apparatus employing a liquid developer.

10. An information recording apparatus as claimed in claim 3, wherein said magnetic recording layer has a vertical magnetic anisotropy.

11. An information recording apparatus as claimed in claim 3, wherein said magnetic recording layer has a horizontal magnetic anisotropy.

* * * * *